US011243083B2

(12) United States Patent
Chen et al.

(10) Patent No.: US 11,243,083 B2
(45) Date of Patent: Feb. 8, 2022

(54) IMPLEMENTING ROUTE GENERATION WITH AUGMENTED REALITY

(71) Applicant: International Business Machines Corporation, Armonk, NY (US)

(72) Inventors: Jim C. Chen, Rochester, MN (US); Brittany A. Duffy, Rochester, MN (US); Elizabeth Held, Rochester, MN (US); Bryant G. Ly, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 16/004,803

(22) Filed: Jun. 11, 2018

(65) Prior Publication Data

US 2019/0376792 A1 Dec. 12, 2019

(51) Int. Cl.
*G01C 21/20* (2006.01)
*A62B 99/00* (2009.01)
*G06T 19/00* (2011.01)
*G06T 11/60* (2006.01)
*G01C 21/36* (2006.01)
*G06Q 90/00* (2006.01)
*A62B 3/00* (2006.01)
*G06T 11/00* (2006.01)

(52) U.S. Cl.
CPC ............ *G01C 21/206* (2013.01); *A62B 99/00* (2013.01); *G01C 21/3647* (2013.01); *G06Q 90/205* (2013.01); *G06T 11/60* (2013.01); *G06T 19/006* (2013.01); *A62B 3/00* (2013.01); *G06T 11/00* (2013.01)

(58) Field of Classification Search
CPC .. G01C 21/206; G01C 21/3647; A62B 99/00; A62B 3/00; G06T 19/006; G06T 11/60; G06T 11/00; G06Q 90/205
See application file for complete search history.

(56) References Cited

U.S. PATENT DOCUMENTS

| 2009/0319902 | A1* | 12/2009 | Kneller | G06F 3/048 715/733 |
| 2013/0053063 | A1 | 2/2013 | McSheffrey | |

(Continued)

FOREIGN PATENT DOCUMENTS

WO WO-2018048913 A1 * 3/2018 ............. G08B 25/10

OTHER PUBLICATIONS

B. Gabbar, "Can technology determine the best escape route for firefighters?" http://wildfiretoday.com/2017/09/29/can-technology-determine-the-best-escape-route-for-firefighters/ Sep. 29, 2017.

(Continued)

*Primary Examiner* — Harry Y Oh
*Assistant Examiner* — Sohana Tanju Khayer
(74) *Attorney, Agent, or Firm* — Scott Dobson

(57) ABSTRACT

A method, system and computer program product are provided for implementing route generation with augmented reality. A crowd or event is analyzed and escape routes are intelligently distributed by attendee profile type or ability. Augmented Reality (AR) projections are used representing different subsets of an event population to convey the profile-specific escape routes for people to follow. The AR behavior is changed as an event situation changes.

14 Claims, 8 Drawing Sheets

(56) References Cited

U.S. PATENT DOCUMENTS

| | | | |
|---|---|---|---|
| 2013/0116922 A1 | 5/2013 | Cai et al. | |
| 2014/0222329 A1* | 8/2014 | Frey | G01C 21/206 |
| | | | 701/423 |
| 2015/0066353 A1* | 3/2015 | Klein | G01C 21/206 |
| | | | 701/408 |
| 2015/0348220 A1* | 12/2015 | Sharma | G08B 7/066 |
| | | | 705/324 |
| 2017/0109936 A1* | 4/2017 | Powderly | G06F 3/0482 |
| 2017/0178013 A1 | 6/2017 | Beloglazov et al. | |
| 2017/0206795 A1* | 7/2017 | Kaleal, III | G16H 20/40 |
| 2017/0341746 A1 | 11/2017 | Erickson et al. | |
| 2018/0053394 A1* | 2/2018 | Gersten | G06F 9/453 |
| 2020/0135042 A1* | 4/2020 | An | G09B 5/06 |

OTHER PUBLICATIONS

J. Ahn et al., "Rescue Me: An Indoor Mobile Augmented-Reality Evacuation System by Personalized Pedometry." In Proceedings of the IEEE Asia-Pacific Services Computing Conference, Jeju, Korea, pp. 70-77, Dec. 2011.

L. Chittaro, "Presenting evacuation instructions on mobile devices by means of location-aware 3D virtual environments." In Proceedings of the 10th international conference on Human computer interaction with mobile devices and services (MobileHCI '08). ACM, New York, NY, USA, pp. 395-398, Sep. 2-5, 2008.

I. Aedo et al., "Personalized Alert Notifications and Evacuation Routes in Indoor Environments." Sensors, pp. 7804-7827, 2012.

Anonymous, "Method for Individualized Emergency Exit Facilitation," IP.com Disclosure No. IPCOM000177571D, Original Publication Date: Dec. 18, 2008.

Hu et al., "State of Virtual Reality Based Disaster Preparedness and Response Training" pp. 1-13, Apr. 2013 https://techcrunch.com/2013/07/09/hateya-uses-augmented-reality-glasses-to-help-firefighters-escape-burning-buildings/.

Frederick Lardinois, "Hateya Uses Augmented Reality Glasses to Help Firefighters Escape Burning Buildings", Jul. 9, 2013 http://currents.plos.org/disasters/article/state-of-virtual-reality-vr-based-disaster-preparedness-and-response-training/.

* cited by examiner

600

IMPLEMENTING ROUTE GENERATION WITH AUGMENTED REALITY

FIELD OF THE INVENTION

The present invention relates generally to the data processing field, and more particularly, relates to a method, system and computer program product for implementing enhanced intelligent escape route generation with augmented reality.

DESCRIPTION OF THE RELATED ART

A novel system is needed to address the difficulty of efficiently guiding large crowds of people out of high density venues during emergencies. Often there is an accompanying chaos when an emergency occurs at concerts, airports, stadiums and the like. A herd mentality may form leading to greater confusion and lack of awareness of the location of the source of an emergency. Lack of awareness of potential routes may also clog the trivial routes, endangering those who cannot take alternate exit paths when they do exist for others. Additionally, scenarios will change when the source of the emergency is moving, for example an active gunman. Conversely emergency response units may also arrive in the middle of the confusion and cannot be sure which direction to go as well.

A need exists for an efficient and effective mechanism for implementing enhanced intelligent escape route generation with augmented reality.

SUMMARY OF THE INVENTION

Principal aspects of the present invention are to provide a method, system and computer program product for implementing enhanced intelligent escape route generation with augmented reality. Other important aspects of the present invention are to provide such method, system and computer program product substantially without negative effects and that overcome many of the disadvantages of prior art arrangements.

In brief, a method, system and computer program product are provided for implementing enhanced intelligent escape route generation with augmented reality. A crowd or event is analyzed and escape routes are intelligently distributed by attendee profile type or ability. Augmented Reality (AR) projections are used representing different subsets of an event population to convey the profile-specific escape routes for people to follow. The AR behavior is changed as an event situation changes.

In accordance with features of the invention, the analysis of population to determine escape route distribution takes into account physical attributes, such as athletic ability, of a person as well as venue or event specific data to leave trivial routes more open to those who cannot take alternative escape routes.

In accordance with features of the invention, an area is fully configured with networked AR projection devices. An avatar of a specific body type and athletic ability is then projected running at that profile's real athletic speed for people to follow.

In accordance with features of the invention, a database of computer generated images (CGI), motion capture with real people or an avatar library of different avatars running is used with the Augmented Reality (AR) projections.

In accordance with features of the invention, each venue's physical layout is analyzed prior to any event. Evacuation routes for physical buildings advantageously are available already. These routes would be stored in a Layout Archive Entity.

In accordance with features of the invention, once all routes are known the Layout Archive Entity scores each route based on several factors, including for example, accessibility, width and narrowness of pathways/corridors to estimate throughput of people, physical assertion required, merging and intersection points with other routes, and alternatives available on each route.

In accordance with features of the invention, each route is broken up into segments and using the intersection points with other routes a route map is generated.

In accordance with features of the invention, a profile analysis entity processes information on the event and the attendees including pre-event analysis and event real-time analysis.

In accordance with features of the invention, dynamic tuning of the routes and AR projections are based on real time results of the population and reaction to changes in an emergency.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and system are provided for implementing enhanced intelligent escape route generation with augmented reality.

Figure 1:
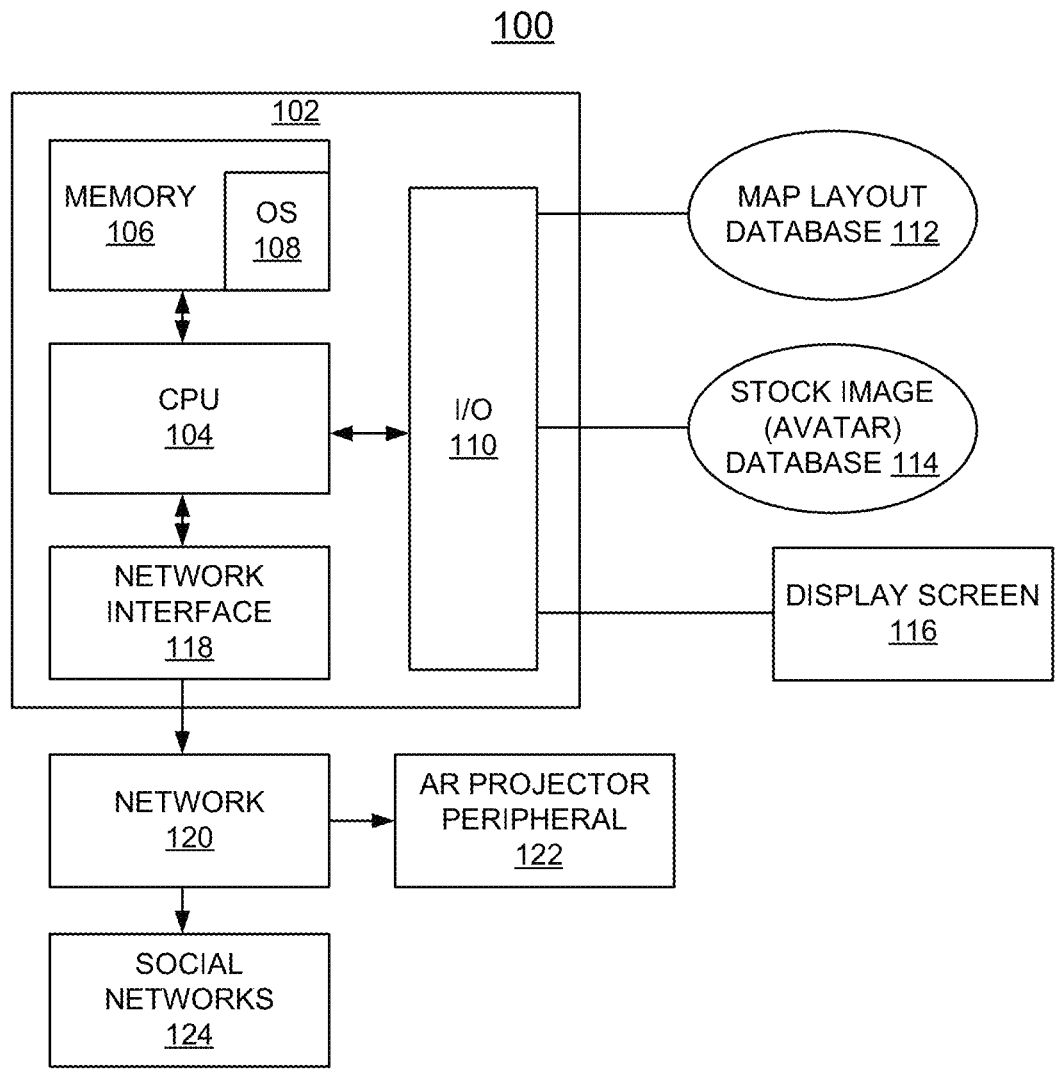
FIGS. 1 and 2 together provide a block diagram of an example computer system for implementing enhanced intelligent escape route generation with augmented reality in accordance with preferred embodiments.
Figure 2:
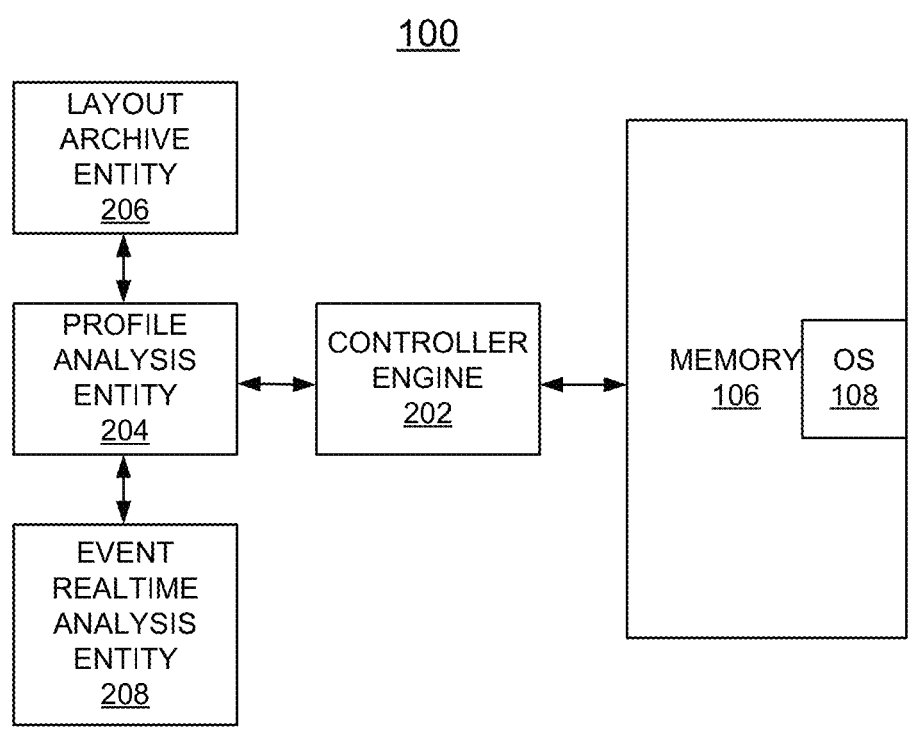

Having reference now to the drawings, in FIGS. 1 and 2, there is shown an example computer system embodying the present invention generally designated by the reference character 100 for implementing enhanced intelligent escape route generation with augmented reality in accordance with preferred embodiments. Computer system 100 includes a processor system 102 including one or more processors 104 or general-purpose programmable central processing units (CPUs) 104. As shown, computer system 100 includes a single CPU 104; however, system 100 can include multiple processors 104 typical of a relatively large system.

Computer system 100 includes a system memory 106 including an operating system 108. System memory 106 is a random-access semiconductor memory for storing data, including programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

Computer system 100 includes an I/O interface 110 for transferring data to and from I/O system components including a map layout database 112, a stock image database 114, such as a stock Avatar database 114, and a display screen 116. The map layout database 112 includes a physical layout for each venue. The stock image database 114 or stock Avatar database 114 includes for example, a library of different avatars running, a database of computer generated images (CGI), motion capture with real people or an avatar library of different avatars running that is used with the Augmented Reality (AR) projections, for example, on the display screen 116.

As shown in FIG. 1, computer system 100 includes a network interface 118 coupled to a network 120 which is connected to an augmented reality (AR) peripheral 122 and social networks 124.

Referring also to FIG. 2, computer system 100 includes a controller engine 202 coupled to the system memory 106 including the operating system 108, a profile analysis entity 204, a layout archive entity 206, and an event real-time analysis entity 208. The layout archive entity 206 analyzes each venue's physical layout prior to any event and stores available evacuation routes in the layout archive entity 206. Once all routes are known the layout archive entity 206 scores each route based on a several factors, including for example, accessibility, width and narrowness of pathways/corridors to estimate throughput of people, physical assertion required, merging and intersection points with other routes, and alternatives available on each route. The profile analysis entity 204 is a software entity that processes information on the event and the attendees. Pre-Event analysis looks at what a specific event is and builds a knowledge base of the expected attendees via ticketing information and buyers' ages, historical demographics of similar or the same event from the past, and social media mentions. At the beginning or during the event, the event real-time analysis entity 208 tunes its assessment of the population via visual profiling through camera and images, social media/networks, biometrics via Smartwatch, and recorded public workout results on fitness apps.

In accordance with features of the invention, the new technology system 100 of the preferred embodiment uses Augmented Reality (AR) projections. Using special projector hardware, a three-dimensional image is materialized in the visual field of the projector. Escape routes are intelligently mapped-out for high population events, using attributes and analysis of the population and then leveraging Augmented Reality (AR) to act as beacons and guides by generating images or avatars for each sub-group of the population and then having these avatars traverse the designated escape route for that profile, for the real attendees to follow.

Multiple images or Avatars representing a subset of the population, for example elderly, athletic, wheelchair profile subsets are chosen and assigned to routes in which that profile can safely and effectively traverse. AR projections of images or Avatars are generated and projected as moving along the route, allowing individuals to follow or chase the augmented reality image that resembles their physical attributes and abilities the most. The profile analysis entity 204 creates, for example, 10 age groups at 10-year intervals, such as less than 10-year-old, 10-20, 20-30, and the like. Through the sampling the profile analysis entity 204 then estimates the percentage of the population in each of the age groups. Using biometrics and access to public information of various fitness applications (Apps), the profile analysis entity 204 estimates the relative athletic ability of the population in each group. The profile analysis entity 204 factors in known trivial attributes of the event, such as, Special Olympics event, body building event, craft show, and the like as the nature of the event often will indicate the type of person in the attendance population. The profile analysis entity 204 stores the result of this analysis, which is a set of subset profiles that represent the group. This can help determine how to distribute the routes. If the population seems to be mostly young adults and very athletic, then the system will assign avatars and routes differently than a population of mostly children.

In accordance with features of the invention, each venue's physical layout is analyzed prior to any event. Evacuation routes for physical buildings typically are available already. These routes would be stored in the layout archive entity 206. Once all routes are known the Layout Archive Entity would score each route based on a several factors as illustrated in the following example TABLE 1. For example, in TABLE 1, Accessibility is provided from 1-10, with 10 meaning it is the most accessible, so that anyone can traverse the route. An Accessibility of 1 represents the least accessibility and only people with certain athletic stature should attempt the route. Physical Ability represents the physical ability needed for an individual to traverse that specific path rated from 1-10, with 10 being the highest most athletic profile.

TABLE 1

| Route ID | Accessibility | Physical Ability | Intersects | Segments | Avatar Type | Description |
|---|---|---|---|---|---|---|
| 1 | 10 | 1 | 2, 3 | 12 | | |
| 2 | 5 | 5 | 1 | 17 | | |
| 3 | 1 | 10 | 1 | 23 | | |
| 4 | 8 | 1 | 1 | 12 | | |
| 5 | 7 | 4 | 2 | 9 | | |
| 6 | 3 | 3 | 2 | 10 | | |

In accordance with features of the invention, each route is broken up into segments and using the intersection points with other routes a route map is generated.

The controller engine 202 then assigns an image profile type or avatar type needed to cover each subset profile, for example, Elderly Avatar (Avatar Type 1, projection speed of 1-3 mph), Wheelchair Avatar (Avatar Type 2, projection speed of 2-3 mph), Average20-30 Avatar (Avatar Type 3, projection speed of 3-7 mph), and Athletic20-30 Avatar (Avatar Type 4, projection speed of 5-10 mph). The controller engine 202 takes the inputs of the profile analysis entity 204 and pairs them with the scored routes, for example, as illustrated in TABLE 2

TABLE 2

| Route ID | Accessibility | Physical Ability | Intersects | Avatar Type | Description |
|---|---|---|---|---|---|
| 1 | 10 | 1 | 2, 3 | All | |
| 2 | 5 | 5 | 1 | 3, 4 | |
| 3 | 1 | 10 | 1 | 4 | |
| 4 | 8 | 1 | 1 | 2, 3, 4 | |
| 5 | 7 | 4 | 2 | 3, 4 | |
| 6 | 3 | 3 | 2 | All | |

The system when an emergency occurs, using visual/audio analytics as well as initial crowd density movements a pattern can be learned to pinpoint the source of the issue. A user administrator can also confirm the location of the source in the layout entity. Once the source of the issue is known, the escape paths are then selected, for example, as illustrated in TABLE 3:

Once the path is selected, the direction of the traffic flow must be determined, obviously away from the source. Finally, since a source may fall in the middle of a route(s) the system needs to determine where to start each selected route based on the segments of the route that are still available and safe, for example, Route #6 in TABLE 3.

The profile images or avatars are then projected. The avatars may be projected at ground level if the population is sparse, or they will be projected above the crowd in more crowded corridors. Individuals will initially see a wave of different avatars. Once they are moving in the right direction, each individual can then focus on chasing a particular avatar that matches their physical profile or an avatar whose speed is something they can keep up with or maintain pace.

TABLE 3

| Route ID | Accessibility | Physical Ability | Intersects | Avatar Type | Use? | Direction | Start Segment | Description |
|---|---|---|---|---|---|---|---|---|
| 1 | 10 | 1 | 2, 3 | All | Y | N | 12 | Main Route to North Street-No stairs |
| 2 | 5 | 5 | 1 | 3, 4 | Y | W | 1 | Exit to skyway-1 long stair |
| 3 | 1 | 10 | 1 | 3 | Y | W | 4 | Exit to loading dock-fastest route-but many stairs and obstacles |
| 4 | 8 | 1 | 1 | 2, 3, 4 | N | na | na | In vicinity of emergency source |
| 5 | 7 | 4 | 2 | 3, 4 | N | na | na | In path of emergency source |
| 6.1 | 3 | 3 | 2 | All | Y-Split | E | 4 | Emergency affects segment #5. |
| 6.2 | 3 | 3 | 2 | All | Y-Split | W | 6 | Emergency affects segment #5. |

The system provides dynamic routing and tuning. For example, if the source changes, such as fire spreading, the routes will change as well and the projections will change accordingly. Additionally, the system would use visual feedback and tracking of actual people as they proceed through the route to determine if the projected avatar behavior is realistic for that profile. Or if the population is following the correct avatar. The system would then adjust one or more avatars accordingly.

The system is dynamic such that if the emergency source changes, the AR projections also change course as well to a new established route. The invention also dynamically tunes the frequency, behavior and speed the avatars are traveling based on actual results of people who have successfully traversed the route. The invention also works for emergency response units. The escape routes can be reversed, and an appropriate avatar, such as a Firefighter, can be projected running the reverse route of the escaping avatars to lead the emergency response units towards the source of the emergency.

In accordance with features of the invention, a problem with herd mentality where often times the masses will crowd trivial passages endangering the elderly or physically handicapped is overcome. The system of the invention considers alternatives that can be traversed by individuals of higher athletic ability that may not be initially trivial. If these groups exist in the population, then faster moving, athletic-build avatars are shown and if individuals can keep up with them then they should follow them. This should alleviate traffic on the more obvious routes that can be used for those who have no alternatives.

In accordance with features of the invention, system 100 is configured to be leveraged by emergency response units as well. Avatars representing firemen, policemen, medics can be generated based on the source type of the emergency if that can be discerned. Then these avatars would be projected running in the reverse direction of the main escape paths. This embodiment would be shown later or less frequency to avoid causing too much projection traffic as the priority is for the escape routes. System 100 optionally is configured to work with wearable AR enabled devices or even displayed on mobile devices when a fully AR projection enabled area is not available.

Figure 3:
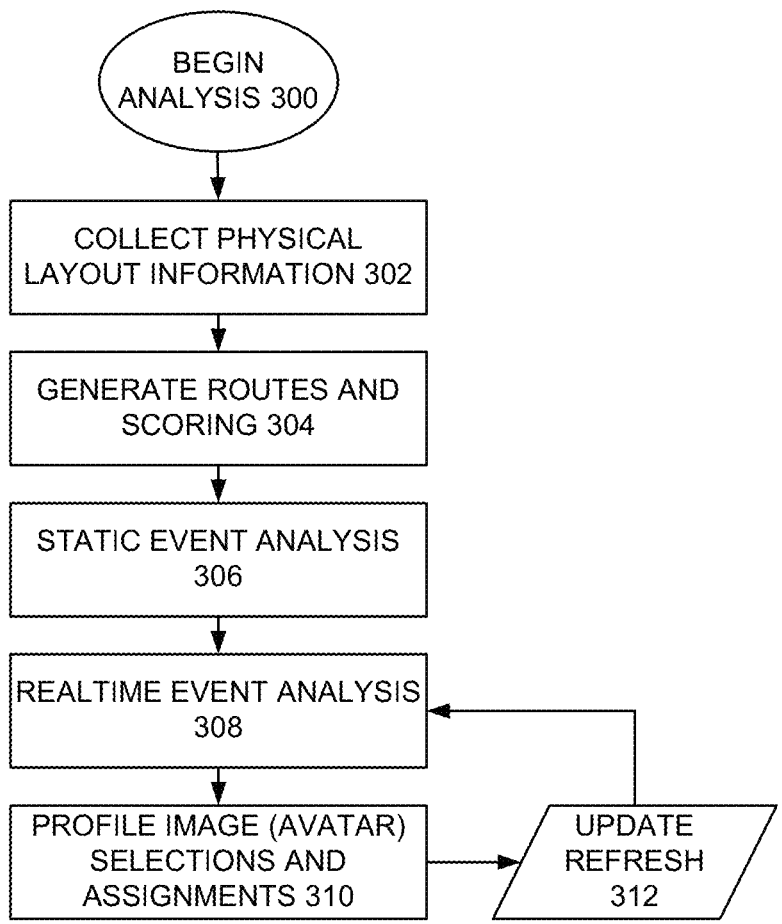
FIGS. 3, 4, and 5 are respective flow chart illustrating example system operations to implement intelligent escape route generation with augmented reality of FIGS. 1 and 2 in accordance with preferred embodiments.
Figure 4:
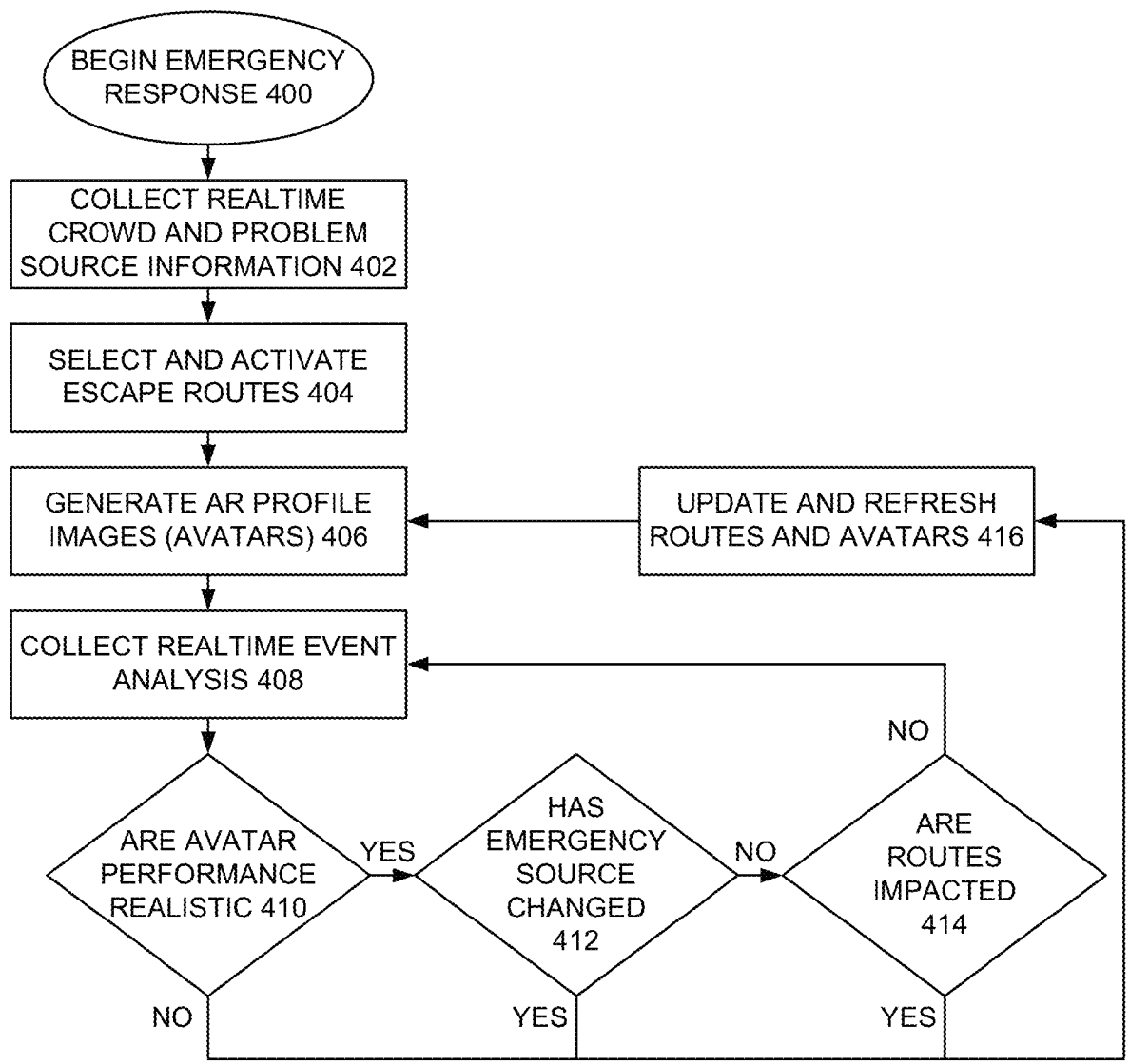
Figure 5:
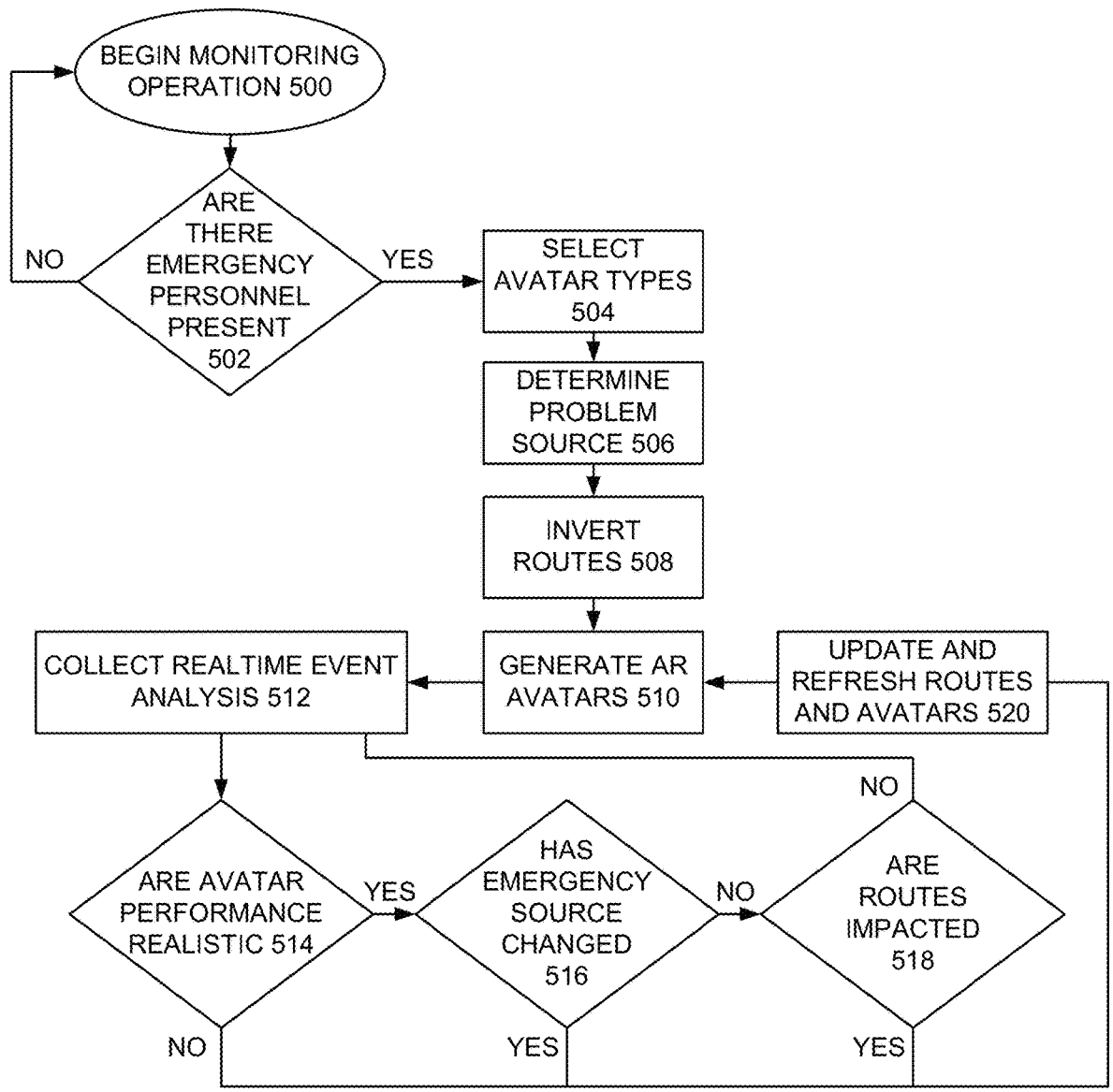

Referring to FIGS. 3, 4, and 5, there are shown example system operations of computer system 100 of FIGS. 1 and 2, for implementing enhanced intelligent escape route generation with augmented reality in accordance with preferred embodiments, further as described with respect to FIGS. 1 and 2, and TABLES 1, 2, and 3 above.

Referring to FIG. 3 operations start at a block 300. As indicated at a block 302, physical layout information is collected. As indicated in a block 304, escape routes are generated and scoring of the escape routes is performed. As indicated in a block 306, static event analysis is performed.

As indicated in a block 308, then real-time event analysis is performed. As indicated in a block 310, profile image or avatar selections and assignments are performed. Routines for updating and refreshing are performed as indicated in a block 312.

Referring to FIG. 4, there are shown example system operations of computer system 100 of FIGS. 1 and 2, for implementing enhanced intelligent escape route generation with augmented reality in accordance with preferred embodiments starting at a block 400 where emergency response processing begins. As indicated at a block 402, real-time crowd and problem source information are collected. As indicated at a block 404, escape routes are selected and activated. As indicated at a block 406, next profile image or avatars are generated. As indicated at a block 408, collecting real-time event analysis is performed. As indicated at a decision block 410, checking whether avatar performance is realistic is performed. If avatar performance is realistic, as indicated at a decision block 412, checking whether the emergency source has changed is performed. If the emergency source has not changed, as indicated at a decision block 414, checking whether escape routes are impacted is performed. If escape routes are not impacted, then operations return to block 408 for collecting real-time event analysis and continue.

Otherwise if avatar performance is not realistic, or the emergency source has changed, or escape routes are impacted, then escape routes and avatars are updated and refreshed indicated at a block 416. Then operations return to block 406 for generating profile images or avatars and continue.

Referring to FIG. 5, there are shown example system operations of computer system 100 of FIGS. 1 and 2, for implementing enhanced intelligent escape route generation with augmented reality in accordance with preferred embodiments starting at a block 500 where monitoring operation begins. As indicated at a decision block 502, checking whether emergency personnel are present is performed. When emergency personnel are not present, checking for emergency personnel being present continues at decision block 502. When emergency personnel are present, projected image or avatar types are selected, as indicated at a block 504. A problem source is determined, as indicated at a block 506. Escape routes are inverted, as indicated at a block 508. Augmented reality (AR) images or avatars are generated, as indicated at a block 510. As indicated at a block 512, collecting real-time event analysis is performed.

As indicated at a decision block 514, checking whether avatar performance is realistic is performed. If avatar performance is realistic, as indicated at a decision block 516, checking whether the emergency source has changed is performed. If the emergency source has not changed, as indicated at a decision block 518, checking whether escape routes are impacted is performed. If escape routes are not impacted, then operations return to block 512 for collecting real-time event analysis and continue. Otherwise if avatar performance is not realistic, or the emergency source has changed, or escape routes are impacted, then escape routes and avatars are updated and refreshed indicated at a block 520. Then operations return to block 510 for generating profile images or avatars and continue.

Figure 6:
FIGS. 6 and 7 are respective simulated renderings illustrating example generated escape route with avatars generated via (augmented reality) AR projections and via an example mobile device in accordance with preferred embodiments.
Figure 7:
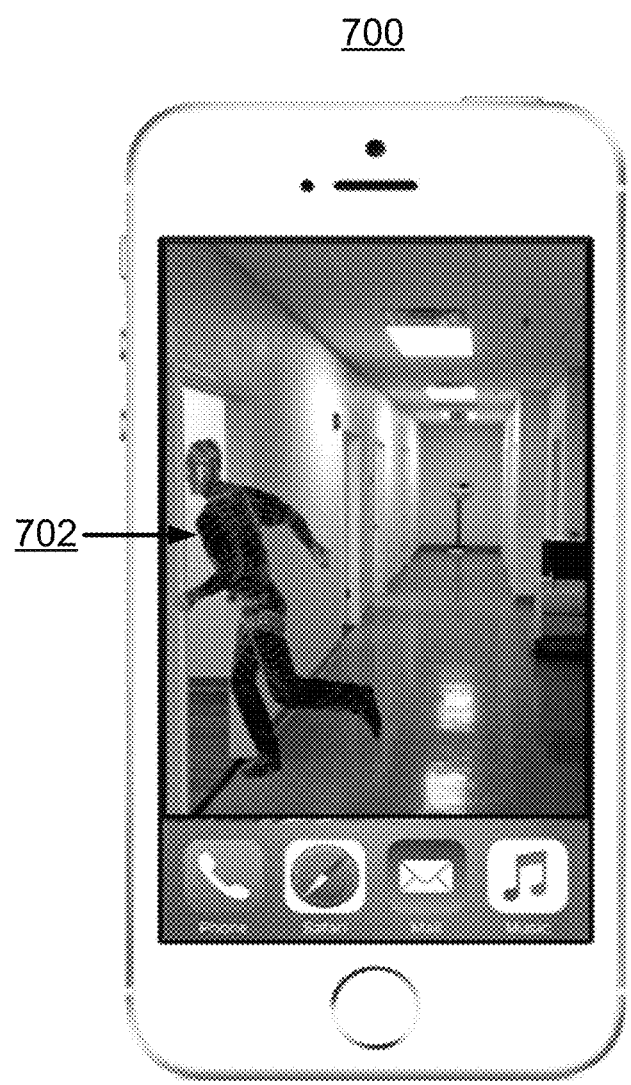

Referring now to FIGS. 6 and 7, there are shown respective example simulated renderings generally designated by the respective reference characters 600 and 700 illustrating respective example escape routes with avatars generated via (augmented reality) AR projections and via a mobile device in accordance with preferred embodiments.

In FIG. 6, the simulated rendering 600 provides an example generated escape route including an avatar 602, one shown. Each individual using the generated via AR projections 600 can focus on chasing a particular avatar 602 whose speed is something the individual can keep up with or maintain that pace.

In FIG. 7, an avatar 702 is displayed on a mobile device in the example generated escape route simulated rendering 700, that is used, for example, when a fully AR projection enabled area is not available.

Figure 8:
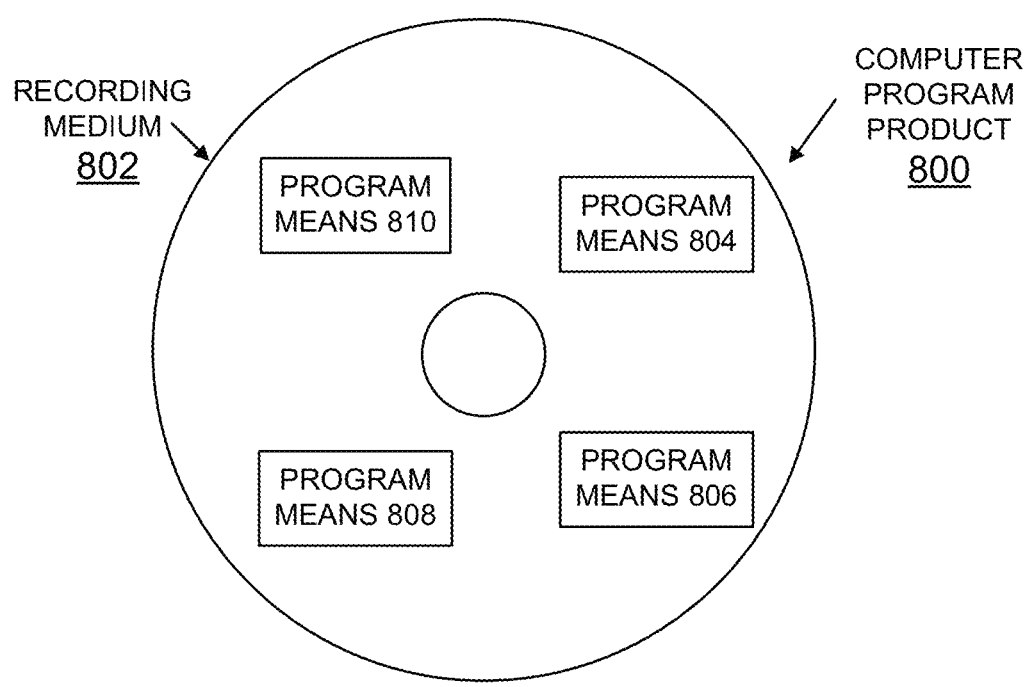
FIG. 8 is a block diagram illustrating a computer program product in accordance with the preferred embodiment.

Referring now to FIG. 8, an article of manufacture or a computer program product 800 of the invention is illustrated. The computer program product 800 is tangibly embodied on a non-transitory computer readable storage medium that includes a recording medium 802, such as, a floppy disk, a high capacity read only memory in the form of an optically read compact disk or CD-ROM, a tape, or another similar computer program product. Recording medium 802 stores program means 804, 806, 808, and 810 on the medium 802 for carrying out the methods for implementing enhanced intelligent escape route generation with augmented reality in the system 100 of FIGS. 1 and 2.

A sequence of program instructions or a logical assembly of one or more interrelated modules defined by the recorded program means 804, 806, 808, and 810, direct the system 100 for implementing enhanced intelligent escape route generation with augmented reality of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for implementing enhanced intelligent escape route generation with augmented reality comprising:
   analyzing an event and attendees of the event to generate a plurality of routes and a plurality of subset profiles for the attendees based on physical attributes, each of the plurality of subset profiles associated with a different plurality of the attendees;
   determining accessibility of each of the plurality of routes;
   assigning a different avatar for each subset profile, each assigned avatar representing the physical attributes of the respective subset profile;
   generating a different escape route for each of the subset profiles based on accessibility of the plurality of routes and physical attributes of the respective subset profile;
   generating, for each subset profile, an augmented reality projection of the assigned avatars moving along the respective generated escape routes; and
   generating an augmented reality projection of an emergency response unit avatar moving in a reverse direction for one or more of the generated escape routes.

2. The method of claim 1, wherein speed of each augmented reality projection moving along a generated escape route is determined based on physical attributes of the corresponding subset profile.

3. The method of claim 1, further comprising:
   dynamically tuning avatar projections based on actual results of people successfully traversing escape routes.

4. The method of claim 1, wherein frequency of the projection of the emergency response unit is less than frequency of the projection of the assigned avatars for subset profiles.

5. The method of claim 1, wherein analyzing the event comprises processing a layout archive entity.

6. A system for implementing enhanced intelligent escape route generation with augmented reality comprising:
   a processor; and
   a controller tangibly embodied in a non-transitory computer readable storage medium used to implement enhanced intelligent escape route generation, the processor configured to use the controller to perform operations comprising:
      analyzing an event and attendees of the event to generate a plurality of routes and a plurality of subset profiles for the attendees based on physical attributes, each of the plurality of subset profiles associated with a different plurality of the attendees;
      determining accessibility of each of the plurality of routes;
      assigning a different avatar for each subset profile, each assigned avatar representing the physical attributes of the respective subset profile;
      generating a different escape route for each of the subset profiles based on accessibility of the plurality of routes and physical attributes of the respective subset profile;
      generating, for each subset profile, an augmented reality projections of the assigned avatar moving along the respective generated escape routes; and
      generating an augmented reality projection of an emergency response unit avatar moving in a reverse direction for one or more of the generated escape routes.

7. The system of claim 6, wherein speed of each augmented reality projection moving along a generated escape route is determined based on physical attributes of the corresponding subset profile.

8. The system of claim 6, wherein the operations further comprise:
   dynamically tuning avatar projections based on actual results of people successfully traversing escape routes.

9. The system of claim 6, wherein frequency of the projection of the emergency response unit is less than frequency of the projection of the assigned avatars for subset profiles.

10. The system of claim 6, wherein analyzing the event comprises processing a layout archive entity.

11. A computer program product comprising a non-transitory computer readable storage medium having program instructions embodied therewith, the program instructions executable by a computer system to cause the computer system to perform operations comprising:
   analyzing an event and attendees of the event to generate a plurality of routes and a plurality of subset profiles for the attendees based on physical attributes, each of the plurality of subset profiles associated with a different plurality of the attendees;
   determining accessibility of each of the plurality of routes;
   assigning a different avatar for each subset profile, each assigned avatar representing the physical attributes of the respective subset profile;
   generating a different escape route for each of the subset profiles based on accessibility of the plurality of routes and physical attributes of the respective subset profile;
   generating, for each subset profile, an augmented reality projections of the assigned avatar moving along the respective generated escape routes; and
   generating an augmented reality projection of an emergency response unit avatar moving in a reverse direction for one or more of the generated escape routes.

12. The computer program product of claim 11, wherein speed of each augmented reality projection moving along a generated escape route is determined based on physical attributes of the corresponding subset profile.

13. The computer program product of claim 11, wherein the operations further comprise:
   dynamically tuning avatar projections based on actual results of people successfully traversing escape routes.

14. The computer program product of claim 11, wherein frequency of the projection of the emergency response unit is less than frequency of the projection of the assigned avatars for subset profiles.

* * * * *